United States Patent [19]
Yamamoto et al.

[11] Patent Number: 5,736,090
[45] Date of Patent: Apr. 7, 1998

[54] METHOD OF IN-MOLD COATING

[75] Inventors: Yoshiaki Yamamoto; Kenji Ohta; Kenji Yonemochi, all of Komaki; Satoshi Fujii, Kasugai; Takeshi Fujishiro; Toshiaki Izumida, both of Hiratsuka, all of Japan

[73] Assignees: Dai Nippon Tokyo Co., Ltd., Osaka; Mitsubishi Engineering-Plastics Corp., Tokyo, both of Japan

[21] Appl. No.: 618,716

[22] Filed: Mar. 20, 1996

[30] Foreign Application Priority Data

Mar. 23, 1995 [JP] Japan ................. 7-064560

[51] Int. Cl.$^6$ ............... B29C 45/16; C08G 18/00
[52] U.S. Cl. ........................... 264/255; 525/455
[58] Field of Search ................ 264/255; 525/455

[56] References Cited

U.S. PATENT DOCUMENTS

| | | | |
|---|---|---|---|
| 4,477,405 | 10/1984 | Makhlouf et al. | 264/250 |
| 4,668,460 | 5/1987 | Ongena | 264/255 |
| 5,254,611 | 10/1993 | McDermott | 524/198 |
| 5,496,509 | 3/1996 | Yamamoto et al. | 264/129 |

FOREIGN PATENT DOCUMENTS

| | | |
|---|---|---|
| 0 039 588 | 11/1981 | European Pat. Off. . |
| 0 048 117 | 3/1982 | European Pat. Off. . |
| 0048117 | 3/1982 | European Pat. Off. . |
| 2 108 987 | 5/1983 | United Kingdom . |

*Primary Examiner*—Jan H. Silbaugh
*Assistant Examiner*—Suzanne E. Mason
*Attorney, Agent, or Firm*—Oblon, Spivak, McClelland, Maier & Neustadt, P.C.

[57] ABSTRACT

A method of in-mold coating using a coating composition including:

(A) a vehicle component including (i) a urethane acrylate oligomer or a urethane methacrylate oligomer, which is a reaction product containing no substantial unreacted isocyanate groups, of (a) an organic polyisocyanate, (b) an organic polyol and (c) a hydroxyalkyl acrylate or a hydroxyalkyl methacrylate, and (ii) a polymerizable unsaturated monomer, (B) a polyisocyanate compound, and (C) a polymerization initiator.

20 Claims, No Drawings

METHOD OF IN-MOLD COATING

The present invention relates to a method of in-mold coating. More particularly, it relates to a method of in-mold coating, comprising steps of injecting a melt of a thermoplastic resin molding material into a mold cavity, followed by molding, then injecting a coating composition between the molded product and the inner wall of the mold, followed by curing the coating composition, and then withdrawing the coated molded product from the mold.

In various fields including the automobile field, coating for molded products of thermoplastic resins is required to satisfy ornamental requirements as well as the durability such as weather resistance. It has been common that a molded product of a thermoplastic resin is formed in a mold, then the molded product is taken out from the mold, and then coating is applied on the surface of the molded product by a coating process such as surface treatment, primer coating, top coating, etc.

However, such a coating process requires cumbersome steps and requires large amounts of costs for installations and man powers for coating. As methods for solving such a problem, a number of in-mold coating methods have been employed mainly for primer coating in compression molding methods or injection molding methods employing molding materials of thermosetting resin type such as SMC (sheet molding compound) and BMC (bulk molding compound) (e.g. U.S. Pat. Nos. 4,076,788, 4,081,578, 4,331,735, 4,366,109 and 4,668,460).

However, when an in-mold coating method is applied to a combination of a conventional thermoplastic resin molding material and an in-mold coating composition, the adhesion between the molding material and the coating composition is usually weak. Accordingly, in order to attain the adhesion of a desired level, it has been common to add a filler or a thermoplastic polymer to the in-mold coating composition, or to use as a vehicle component an epoxy acrylate oligomer which has no adequate weather resistance. However, by such a method, there has been a problem such that the appearance of the coating film, such as gloss, or the durability such as weather resistance, tends to be poor, and the adhesion has also not necessarily been adequate.

It is an object of the present invention to provide a method of in-mold coating, which is capable of forming a single in-mold coating film which has sufficient durability with respect to e.g. adhesion, appearance and weather resistance and which has a function as a top coating applicable to exterior plates of automobiles or outdoor applications such as exterior parts.

The present inventors have conducted extensive studies to attain the above object and as a result, have found it possible to improve the adhesion with the thermoplastic resin molding material by incorporating a certain specific vehicle component and a polyisocyanate compound to the in-mold coating composition. The present invention has been accomplished on the basis of this discovery.

That is, the present invention provides a method of in-mold coating, comprising steps of injecting a melt of a thermoplastic resin molding material into a cavity of a mold, followed by molding, to form a molded product, then injecting a coating composition between the molded product and the inner wall of the mold, followed by curing the coating composition, to form a coated molded product, and withdrawing the coated molded product from the mold, wherein said coating composition comprises:

(A) a vehicle component comprising (i) a urethane acrylate oligomer or a urethane methacrylate oligomer, which is a reaction product containing no substantial unreacted isocyanate groups, of (a) an organic polyisocyanate, (b) an organic polyol and (c) a hydroxyalkyl acrylate or a hydroxyalkyl methacrylate, and (ii) a polymerizable unsaturated monomer, (B) a polyisocyanate compound, and (C) a polymerization initiator.

Now, the present invention will be described in detail.

In carrying out the present invention, the various steps of injecting a melt of a thermoplastic resin molding material into a mold cavity formed in a mold comprising a fixed mold half and a movable mold half, followed by molding, then injecting a coating composition between the molded product and the inner wall of the mold after the molded product has solidified to such an extent that the configuration will not be impaired when the coating composition is injected, followed by curing the coating composition, and then withdrawing the coated molded product from the mold, can be carried out by conventional methods, and the mold behavior immediately prior to or immediately after the injection of the coating composition, the in-mold pressure by the molded product and the pressure for injection of the coating composition are not particularly limited. For example, the present invention is applicable to all of conventional methods such as a method wherein a space is formed between the surface of the molded product to be coated and the inner wall of the mold by parting the fixed mold half and the movable mold half while maintaining them in a closed state, and then the coating composition is injected into the space, as disclosed in Japanese Examined Patent Publication No. 9292/1980, a method wherein the coating composition is injected with a pressure substantially exceeding the in-mold pressure created between the mold and the molded product, as disclosed Japanese Examined Patent Publication No. 33252/1992, and a method wherein a space is formed between the surface of the molded product to be coated and the inner wall of the mold due to a shrinkage of the molded product, and then the coating composition is injected into the space, as disclosed in Japanese Unexamined Patent Publication No. 301251/1993. However, it is preferred that a predetermined amount of the coating compositions is injected to allow the thermoplastic resin molding materials in the mold cavity to be compressed with the injected coating compositions and/or to allow the movable mold half to move in the mold-opening director, and an in-mold pressure before the mold releasing is maintained at a level higher than 0 kgf/cm$^2$ for the formation of the excellent coating films in the glass and adhesion. Moreover, depending on the types of the thermoplastic resin molding materials to be used, the following methods are particularly preferred, since it is thereby possible to form uniform coating films when the coating compositions are injected, or to form coating films excellent in the gloss and adhesion.

(a) In a case where a polyamide resin, a polyamide resin type alloy material comprising a polyamide resin and a crystalline thermoplastic resin, a polyester resin, or a polyester resin type alloy material comprising a polyester resin and a crystalline thermoplastic resin, is used as the thermoplastic resin molding material:

a method wherein the pressure maintaining period of time after the injection of a melt of the thermoplastic resin molding material into the mold cavity is at least 3 seconds, the pressure-maintaining pressure is at least 300 kgf/cm$^2$ (in this specification, the pressure is a gauge pressure unless otherwise specified), and the coating composition is injected between the molded product and the inner wall of the mold with no space formed therebetween under such a condition that the in-mold pressure P immediately before the injection of the coating composition is $0<P\leq 500$ kgf/cm$^2$, preferably $0<P\leq 300$ kgf/cm$^2$.

(b) In a case where a polyamide resin type alloy material comprising a polyamide resin and an amorphous thermoplastic resin and/or a polyester resin type alloy material comprising a polyester resin and an amorphous thermoplastic resin, is used as the thermoplastic resin molding material:

a method wherein a melt of the thermoplastic resin molding material is injected into the mold cavity, followed by molding, then forming a space between the formed molded product and the inner wall of the mold, and then injecting the coating composition into the space. As methods for forming the above space, typical ones may be a method wherein a melt of a thermoplastic resin molding material is injected into a mold cavity in such a state that the mold is maintained under a predetermined clamping force ($F_0$), for example, from 10 to 500 tonf, the pressure is maintained for a predetermined period of time (the period of time from injection of the melt to a time when the weight of the molded product no longer increases even if the pressure is maintained) for molding, then the mold clamping force is reduced so that the clamping force ($F_1$) at the time of the reduction and ($F_0$) would satisfy the condition of, for example, $0\leq (F_1)/(F_0)\leq 0.3$, preferably $0\leq (F_1)/(F_0)<0.1$, to form a space; a method wherein after molding, the mold clamping force is released, so that the fixed mold half and the movable mold half are apart to form a space; and a method wherein a formed molded product is cooled while the above mold clamping force ($F_0$) is maintained, so that the molded product will shrink to form a space. However, the methods for forming such a space are not limited to such typical methods.

The urethane acrylate oligomer or the urethane methacrylate oligomer (hereinafter referred to as the urethane (meth) acrylate) constituting the vehicle component of the in-mold coating composition is a reaction product which can be obtained by reacting (a) a polyisocyanate compound, preferably a diisocyanate compound, (b) an organic polyol compound, preferably an organic diol compound, and (c) a hydroxyalkyl (meth)acrylate and which contains substantially no unreacted isocyanate groups, and it is preferably a compound of the formula (I):

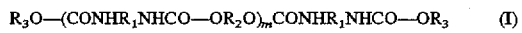
$$R_3O-(CONHR_1NHCO-OR_2O)_m CONHR_1NHCO-OR_3 \quad (I)$$

wherein m is an integer, $R_1$ is a moiety having isocyanate groups removed from a diisocyanate compound, $R_2$ is a moiety having hydroxyl groups removed from a diol compound, and $R_3$ is a moiety having a hydroxyl group removed from a hydroxyl group-containing acrylate or methacrylate. For the preparation of the urethane (meth) acrylate, various conventional polyisocyanate compounds, preferably diisocyanate compounds, may be used. For example, 1,2-diisocyanato-ethane, 1,2-diisocyanato-propane, 1,3-diisocyanatopropane, hexamethylene diisocyanate, lysine diisocyanate, trimethylhexamethylene diisocyanate, tetramethylene diisocyanate, dimeric acid diisocyanate, bis(4-isocyanatocyclohexyl) methane, methylcyclohexane-2,4-diisocyanate, methylcyclohexane-2,6-diisocyanate, 1,3-bis(isocyanato-methyl)cyclohexane, 1,3-bis(isocyanato-ethyl)cyclohexane, 3-isocyanatomethyl-3,5,5-trimethylcyclohexyl isocyanate, 1,3-bis-isocyanatomethyl-benzene, and 1,3-bis(isocyanato-1-methylethyl)benzene, may, for example, be used. These isocyanate compounds may be used alone or in combination as a mixture of two or more of them.

The organic polyol compound, preferably the organic diol compound, to be used for the preparation of the urethane (meth)acrylate may, for example, be an alkyldiol, a polyetherdiol or a polyesterdiol.

The alkyldiol may, for example, be ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 1,9-decanediol, 1,4-cyclohexanediol, 1,4-dimethylolcyclohexane, 4,8-dihydroxytricyclo{5.2.1.0$^{2,6}$}decane, 4,8-bis(hydroxymethyl)tricyclo{5.2.1.0$^{2,6}$}decane, 2,2-bis(4-hydroxycyclohexyl)propane, 2,2-diethylpropane-1,3-diol, 2,2-dimethylpropane-1,3-diol, 3-methylpentane-1,4-diol, 2,2-diethylbutane-1,3-diol, 4,5-nonanediol or 2-butene-1,4-diol.

The polyetherdiol may be the one prepared by polymerization of an aldehyde, an alkylene oxide or a glycol by a known method. For example, a polyetherdiol obtained by addition-polymerizing e.g. formaldehyde, ethylene oxide, propylene oxide, tetramethylene oxide or epichlorohydrin with an alkyldiol under a suitable condition, may, for example, be used.

The polyesterdiol may, for example, be an esterification reaction product obtained by reacting a saturated or unsaturated dicarboxylic acid and/or an acid anhydride thereof with an excess amount of an alkyldiol, or an esterification reaction product obtained by polymerizing an alkyldiol with a hydroxycarboxylic acid and/or a lactone as its internal ester and/or a lactide as an intermolecule ester thereof, may, for example, be employed. The saturated or unsaturated dicarboxylic acid may, for example, be oxalic acid, malonic acid, succinic acid, methylsuccinic acid, 2,3-dimethylsuccinic acid, hexylsuccinic acid, glutaric acid, 2,2-dimethylglutaric acid, 3,3-dimethylglutaric acid, 3,3-diethylglutaric acid, adipic acid, pimelic acid, suberic acid, azalein acid, sebacic acid, 1,2-cyclohexanedicarboxylic acid, 1,3-cyclohexanedicarboxylic acid, 1,4-cyclohexanedicarboxylic acid, 1,1-cyclobutanedicarboxylic acid, phthalic acid, isophthalic acid, terephthalic acid, tetrachlorophthalic acid, maleic acid, fumaric acid, aconite acid, itaconic acid, citraconic acid, mesaconic acid, muconic acid, dihydromuconic acid, and halogen derivatives and alkyl derivatives of these acids. The hydroxycarboxylic acid may, for example, be lactic acid, gluconic acid, α-hydroxybutyric acid, β-hydroxybutyric acid, α-hydroxyisobutyric acid, hydroxystearic acid, resioleic acid or γ-hydroxyvaleric acid.

The above mentioned organic diol compounds may be used alone or in combination as a mixture of two or more of them.

The hydroxyalkyl (meth)acrylate to be used for the preparation of the urethane (meth)acrylate may, for example, be 2-hydroxylethyl (meth)acrylate, 2-hydroxypropyl (meth)acrylate, 4-hydroxylbutyl (meth)acrylate, 3-chloro-2-hydroxypropyl (meth)acrylate, 3-bromo-2-hydroxypropyl (meth)acrylate, 2-chloro-1-(hydroxymethyl)ethyl (meth) acrylate, or 2-bromo-1-(hydroxymethyl)ethyl (meth) acrylate.

The urethane (meth)acrylate to be used in the present invention is the one having a structure represented by the above formula (I) obtainable by reacting the polyisocyanate compound, the organic polyol compound and the hydroxyalkyl (meth)acrylate, as described above.

In the present invention, with a view to improving the weather resistance of the resulting coating film, it is preferred to let at least one of $R_1$ and $R_2$ in the above formula (i) have an aliphatic cyclic structure by using a compound having an aliphatic cyclic structure as at least one of the above mentioned diisocyanate compound and the organic diol compound. Further, it is preferred that m in the above formula (I) is an integer of from 1 to 10, since the resulting coating film will be excellent in the curing property and toughness.

Typical examples of the polymerizable unsaturated monomer in the vehicle component to be used in the present invention, include (meth)acrylate monomers such as methyl (meth)acrylate, ethyl (meth)acrylate, propyl (meth)acrylate, butyl (meth)acrylate, t-butyl (meth)acrylate, 2-ethylhexyl (meth)acrylate, n-nonyl (meth)acrylate, cyclohexyl (meth) acrylate, benzyl (meth)acrylate, dicyclopental (meth) acrylate, 2-dicyclopentenoxyethyl (meth)acrylate, methoxyethyl (meth)acrylate, ethoxyethyl (meth)acrylate, butoxyethyl (meth)acrylate, methoxyethoxyethyl (meth) acrylate, ethoxyethoxyethyl (meth)acrylate, tetrahydrofurfuryl (meth)acrylate, 2-hydroxyethyl (meth)acrylate, 2-hydroxypropyl (meth)acrylate, 4-hydroxybutyl (meth) acrylate, (meth)acrylic acid and (meth)acryloylmorpholine, vinyl monomers such as styrene, vinyl toluene, N-vinyl-2-pyrrolidone, N-vinylimidazole, N-vinylcaprolactum, allyl acetate, vinyl acetate, vinyl propionate and vinyl benzoate, and polyfunctional (meth)acrylates such as trimethyolpropane tri(meth)acrylate, pentaerythritol tetra(meth)acrylate, triallyl cyanurate, triallyl isocyanurate, triallyl formal, 1,3, 5-triacryloylhexahydro-S-triazin, polypropylene glycol di(meth)acrylate and polyethylene glycol di(meth)acrylate.

The polyisocyanate compound to be used in the present invention is a polyisocyanate commonly used for coating materials. For example, an isocyanate single substance such as toluene diisocyanate (TDI), 4,4'-diphenylmethane diisocyanate (MDI), xylene diisocyanate (XDI), hexamethylene diisocyanate (HMDI), lysine diisocyanate (LDI), 2-isocyanatoethyl-2,6-diisocyanatocaproate (LTI), isophorone diisocyamate (IPDI), trimethylhexamethylene diisocyanate (TMDI), hydrogenated xylene diisocyanate (H6XDI), or 4,4'-diphenylmethane diisocyanate (H12MDI), or a prepolymer such as a burette type, an adductor type or isocyanurate type, may be used. From the viewpoint of weather resistance, it is preferred to use an aliphatic polyisocyanate.

The polymerization initiator to be used in the present invention may be a known peroxide which is used for conventional thermosetting resin molding materials, thermosetting in-mold coating compositions or resin synthesis. For example, tert-butyl peroxybenzoate, tert-butyl-2-ethyl hexanoate and tert-butyl peroxyisopropyl carbonate which are frequently used for the in-mold coating compositions, may be mentioned as typical polymerization initiators. Other various peroxides such as ketone peroxides, diacyl peroxides, hydroperoxides, dialkyl peroxides, alkyl peresters, percarbonates and peroxiketals, may also be used as polymerizartion initiators.

The coating composition to be used in the present invention may contain a filler. As such a filler, all of organic and inorganic extenders and pigments which are commonly used for coating, may be employed except for extenders or color pigments which hinder copolymerization of the urethane (meth)acrylate oligomer with the polymerizable unsaturated monomer and thus make it difficult to obtain a satisfactory coating film. The useful filler includes, for example, a color pigment such as titanium dioxide, zinc oxide, carbon black, graphite, iron oxide, phthalocyanine blue, phthalocyanine green or quinacridone red, an extender such as barium sulfate, talc, calcium carbonate, clay or mica, and a metal powder such as an aluminum powder intended for an ornamental purpose.

The coating composition to be used in the present invention may contain an internal release agent. As such an internal release agent, a metal soup such as zinc stearate or calcium stearate, or an aliphatic phosphate, may, for example, be mentioned.

The coating composition to be used in the present invention may further contain a polymerization accelerator, a polymerization inhibitor, an ultraviolet absorber, a surface-regulating agent or a pigment-dispersent, as the case requires.

The coating composition to be used in the present invention is composed of the above described components. With respect to the proportions of the respective components, the coating composition preferably comprises 100 parts by weight of the vehicle component comprising from 20 to 80 wt % of the urethane (meth)acrylate oligomer and from 80 to 20 wt % of the polymerizable unsaturated monomer, from 1 to 10 parts by weight of the polyisocyanate compound, from 0.1 to 5 parts by weight of the polymerization initiator, from 0 to 200 parts by weight of the filler, from 0 to 2 parts by weight of the polymerization accelerator, and from 0 to 3 parts by weight of the internal release agent. With the coating composition containing the respective components in such proportions, the coating film properties and the handling efficiency will be good. Especially with respect to the amount of the polyisocyanate compound, if it is too small, no adequate adhesion will be obtained. On the other hand, if it exceeds 10 parts by weight, unreacted polyisocyanate tends to remain, and consequently, the durability and the appearance of the coating film are likely to be poor.

If the polyisocyanate compound is stored in a state as mixed with other components of the coating composition for a long period of time, it tends to loose the activity by the reaction with impurities in the coating composition, such as water or free acids, or with water in the atmosphere, whereby the desired performance will not be obtained. Therefore, it is preferably mixed with other components of the coating composition immediately prior to coating, by a conventional method. However, the useful time (the permissible period of time for storage) of the coating composition containing all the components other than the polymerization initiator, is not particularly limited, if an adequate quality control is observed. If the polymerization initiator is stored in a state mixed with other components of the coating composition for a long period of time, crosslinking of the vehicle component will proceed by the radicals generated from the polymerization initiator, whereby gelation of the coating composition, a change in the fluidity and a deterioration in the coating film properties will result. Therefore, it is common to mix it with other components of the coating composition immediately prior to coating, by a conventional method. Such crosslinking of the vehicle component varies dependenting upon the environment of its use and the curing time set for the coating film, but it usually tends to occur from 1 to 5 days after the mixing. Therefore, the useful time after the mixing is usually from 1 to 5 days.

In the present invention, various conventional thermoplastic resins may be used as the thermoplastic resin molding material. However, a polyamide resin, a polyamide resin type alloy material, a polyester resin or a polyester resin type alloy material is preferred.

The thermoplastic polyamide resin is not particularly limited. It may, for example, be a thermoplastic polyamide obtainable by a ring opening polymerization of a lactam such as ε-caprolactam or ω-laurolactam; a thermoplastic polyamide obtainable from an amino acid such as 6-amino capronic acid, 11-amino undecanoic acid or 12-amino dodecanoic acid; a thermoplastic polyamide obtainable from a diamine such as ethylenediamine, tetraethylenediamine, hexamethylenediamine, undecanemethylenediamine, dodecanemethylenediamine, 2,2,4-trimethylhexamethylenediamine, 2,4,4-trimethylhexamethylenediamine, m-xylenediamine, p-xylenediamine, 1,4-diaminobutane, 3,4-diaminodiphenylamine or paraphenylenediamine, and a dicarboxylic acid such as adipic acid, suberic acid, sebacic acid, dodecanoic diacid, 1,3-cyclohexanedicarboxylic acid, 1,4-cyclohexanedicarboxylic acid, isophtharic acid, terephtharic acid, dimer acid, trimellitic anhydride or terephtharic acid dichloride; or a modified product of such a polyamide. Such conventional thermoplastic polyamide resins may be used alone or in combination as a mixture of two or more of them.

The thermoplastic polyamide resin type alloy material is not particularly limited, and it may be a polymer alloy comprising from 5 to 95 wt % of the above polyamide resin with from 95 to 5 wt % of one or more of the following resins. Such resins may, for example, be a crystalline polyolefin resin such as polyethylene, polypropylene, polymethylpentene, an ethylene-vinyl acetate copolymer or ionomer; a crystalline common resin such as polyvinyl alcohol, polyvinyl butyral or polyvinyl formal: a crystalline engineering plastic such as polybutylene terephtharate, polyethylene terephtharate, liquid crystal polyester, polyacetal, polyphenylene sulfide or polyether ether ketone; other crystalline resin such as fluorine resin or acetyl cellulose; an amorphous common resin such as polyvinyl chloride, polyvinylidene chloride, polyvinyl acetate, an AS resin, an ABS resin, an AES rein, an ASA resin, an ACS resin or a methacryl resin; an amorphous engineering plastic such as polycarbonate, polyphenylene ether, polyimide, polyamidoimide, polyacrylate, polysulfone, polyether sulfone or polyether imide; other amorphous resin such as polystyrene, ionomer or thermoplastic elastomer; or a thermosetting resin such as a polyurethane resin, an unsaturated polyester resin, an epoxy resin or a phenol resin. These resins may be partially modified or may be combined with a compatibilizing agent, in order to improve the compatibility or dispersibility.

The thermoplastic polyester resin is not particularly limited, and it may, for example, be a conventional resin obtainable from a polyhydric alcohol and a polybasic acid. The polyhydric alcohol component may, for example, be ethylene glycol, 1,2-propylene glycol, 1,3-propanediol, 2,2'-dimethyl-1,3-propanediol, trans- or cis-2,2',4,4'-tetramethyl-1,3-cyclobutanediol, 1,4-butanediol, neopentylglycol, 1,5-pentanediol, 1,6-hexanediol, decamethylene glycol, p-xylenediol, bisphenol A, tetrabromobisphenol A, 1,4-cyclohexanedimethanol or 1,3-cyclohexanedimethanol. These polyhydric component may be used alone or in combination as a mixture of two or more of them.

The polybasic acid component may, for example, be terephtharic acid, isophtharic acid, orthophtharic acid, 2-chloroterephtharic acid, 2,5-dichloroterephtharic acid, 2-methylterephtharic acid, 4,4'-stilbenzyl dicarboxyric acid, 4,4'-bisphenyl dicarboxylic acid, 2,6-naphthalene dicarboxylic acid, bisbenzoic acid bis(p-carboxyphenyl)methane, anthracene dicarboxylic acid, 4,4'-diphenyl ether dicarboxyric acid, 4,4'-diphenoxyethane dicarboxylic acid, adipic acid, sebacic acid, azelaic acid, 1,3-cyclohexane dicarboxylic acid, 1,4-cyclohexane dicarboxylic acid, or an acid anhydride of such an acid. These polybasic acid components may be used alone or in combination as a mixture of two or more of them.

A thermoplastic polyester obtainable by the reaction of such a polyhydric alcohol with a polybasic acid, may be mentioned as a typical example. Further, there may be mentioned a polyester resin obtainable by polycondensation of a hydroxy acid or its derivative, or by ring opening polymerization of a cyclic ester, or a mixture of such a resin with the above mentioned polyester resin, or a modified resin of such a polyester resin.

The thermoplastic polyester resin type alloy material is not particularly limited, and it may, for example, be a polymer alloy comprising from 5 to 95 wt % of the above polyester resin and from 95 to 5 wt % of one or more of the following resins. Such resins may, for example, be a crystalline polyolefin resin such as polyethylene, polypropylene, polymethylpentene, an ethylene-vinyl acetate copolymer or ionomer; a crystalline common resin such as polyvinyl alcohol, polyvinyl butyral or polyvinyl formal: a crystalline engineering plastic such as polyamide, polyacetal, polyphenylene sulfide or polyether ether ketone; other crystalline resin such as a fluorine resin or acetyl cellulose; an amorphous common resin such as polyvinyl chloride, polyvinylidene chloride, polyvinylacetate, an AS resin, an ABS resin, an AS resin, an ASA resin, an ACS resin or a methacryl resin; an amorphous engineering plastic such as polycarbonate, polyphenylene ether, polyimide, polyamidoimide, polyacrylate, polysulfone, polyethersulfone or polyether imide; other amorphous resin such as polystyrene, ionomer or a thermoplastic elastomer; or a thermosetting resin such as polyurethane resin, an unsaturated polyester resin, an epoxy resin or a phenol resin. These resins may be partially modified or may be combined with a compatibilizing agent, to improve the compatibility or the dispersibility.

The thermoplastic resin molding material to be used in the present invention, such as the polyamide resin, the polyamide resin type alloy, the polyester resin or the polyester resin type alloy, may contain an ultraviolet absorber, an antioxidant, a nucleating agent, a nucleating additive, a release agent, an antistatic agent, a colorant, a flame retardant, a stabilizer, a plasticizer, a blowing agent, a fiber filler such as a reinforcing glass fiber or an inorganic filler, to satisfy the properties, as the case requires.

In the present invention, it is preferred that the thermoplastic resin molding material contains a resin having functional groups, preferably carboxyl groups or hydroxyl groups, reactive with isocyanate groups of the polyisocyanate compound. With the thermoplastic resin molding material containing such a functional group-containing resin, the adhesion at the coating interface between the thermoplastic resin molding material and the in-mold coating composition will further be strengthened by the reaction of such functional groups with the polyisocyanate compound. Such functional groups of a functional group-containing resin may be those present in the resin from the beginning, i.e. they may be functional groups of the resin having e.g. carboxyl groups or hydroxyl groups. Otherwise, they may be those formed by the reaction during the melt kneading of the thermoplastic resin molding material, i.e. they may be functional groups generated by the reaction with the functional groups in the thermoplastic resin molding material, such as hydroxyl groups which may be generated by the reaction of the terminal amino groups of a polyamide resin with glycidyl groups.

In the present invention, the functional groups reactive with isocyanate groups of the polyisocyanate compound may be functional groups contained in the main component of the thermoplastic resin molding material, such as the polyamide resin, the polyamide resin type alloy, the polyester resin or the polyester resin type alloy, i.e. they may be amide groups in the backbone structure of the resin, or the terminal amino groups, carboxyl groups, or hydroxyl groups.

The resin having functional groups reactive with isocyanate groups of the polyisocyanate compound, or the resin capable of forming such functional groups by the reaction during the melt kneading of the thermoplastic resin molding material, may, for example, be a thermoplastic resin obtained by esterifying a styrene/maleic anhydride copolymer containing a partially esterified carboxyl groups of maleic anhydride, with the copolymerization ratio of the styrene to maleic anhydride being from 1:1 to 3:1 in the equivalent ratio and having a molecular weight of from 1,000 to 2,000, with from 35 to 75% of an alkyl alcohol; an ethylene/methacrylic acid copolymer having a methacrylic acid content of from 1 to 30 wt %; a thermoplastic resin which is a vinyl ester resin of bisphenol A type containing hydroxyl groups and having a molecular weight of from 1,000 to 2,000; an ethylene/vinyl alcohol copolymer containing hydroxyl groups; a butyral resin having a butyral-modified degree of from 10 to 81.6 mol %, containing of hydroxyl groups; a thermoplastic acrylic resin having carboxylic groups and having molecular weight of from 25,000 to 65,000 and an acid value of from 10 to 20 mgKOH/g; an acid-modified acryl/polystyrene polymer which is a graft polymer having a comb structure; an epoxy-modified polystyrene/polystyrene polymer which is a graft polymer having a comb structure; an ethylene/acrylate copolymer having a graft-addition amount of maleic anhydride of from 0.01 to 10 wt %; a thermoplastic modified ether-type polyester resin having an amorphous structure having a part of the ethylene glycol composition of a polyethylene terephthalate modified with a polyglycol such as polyethylene glycol, and having a molecular weight of from 15,000 to 25,000; or an ethylene/glycidyl methacrylate copolymer having polystyrene grafted.

In a case where the resin having functional groups reactive with the polyisocyanate is other than the polyamide resin, the polyamide resin type alloy material, the polyester resin or the polyester resin type alloy material, and such a functional-group-containing resin (hereinafter referred to as a modified resin) is incorporated to the polyamide resin, the polyamide resin type alloy material, the polyester resin or the polyester type resin alloy material, the amount of such a modified resin is preferably adjusted to be from 0.5 to 15 parts by weight, more preferably from 1 to 5 parts by weight, par 100 parts by weight of the polyamide resin, the polyamide resin type alloy material, the polyester resin or the polyester resin type alloy material, whereby good adhesion between the thermoplastic resin molding material and the in-mold coating composition, can be obtained. If the amount is less than 0.5 part by weight, it tends to be difficult to improve the adhesion, when the polyisocyanate content is small. On the other hand, if the amount of its addition exceeds 15 parts by weight, no further improvement of the adhesion can be obtained, and there may sometimes be some adverse effects to other physical properties.

When such a modified resin is incorporated to the polyamide resin, the polyamide resin type alloy material, the polyester resin or the polyester resin type alloy material, a reinforcing material and other additives which are usually added depending upon the properties required for these two resins and for the thermoplastic resin molding material, are melt-kneaded by a conventional method. For example, by means of a conventional melt-kneading apparatus such as a double screw extruder, kneading may be carried out at a melt-kneading temperature depending upon the resins to be kneaded. By such melt-neading, the modified resin will be simply mixed or will be reacted and mixed, with the polyamide resin, the polyamide resin type alloy material, the polyester resin or the polyester resin type alloy material, depending upon the respective properties.

By adopting the method of the present invention, the adhesion at the interface between the coating composition and the thermoplastic resin molding material can be improved, whereby it is possible to reduce or eliminate the addition of a thermoplastic polymer or a filler intended to improve the adhesion with the molding material in spite of the presence of a problem with respect to the appearance and the durability, as employed for the conventional in-mold coating composition, or it has been made possible not to use an epoxy acrylate oligomer or an unsaturated polyester oligomer having no adequate weather resistance, as a vehicle component. Further, by the use of the urethane (meth) acrylate having an aliphatic cyclic structure, it has been made possible to form a single in-mold coating film which has good weather resistance and which functions also as a top coating material applicable to a thermoplastic resin molding material.

Heretofore, for the purpose of the improving the solvent resistance of the coating film, a polyfunctional oligomer such as trimethylol propane (meth)acrylate or pentaerythritol tetra(meth)acrylate has been incorporated. However, such an oligomer has a large curing shrinkage due to curing of the coating film, whereby the adhesive force has deteriorated, and warping of the molded material has resulted. Whereas, in the present invention, a polyisocyanate compound is incorporated to the in-mold coating composition, whereby there will be no problem of curing shrinkage, and not only the adhesion but also the weather resistance and solvent resistance can be improved.

Now, the present invention will be described in further detail with reference to Examples and Comparative Examples. However, it should be understood that the present invention is by no means restricted to such specific Examples.

The compositions (parts by weight) of the in-mold coating compositions used in the following Examples 1 to 4 and Comparative Examples 1 to 7 wherein an urethane (meth) acrylate oligomer having no aliphatic cyclic structure, were as shown in Table 1.

TABLE 1

| Components | Example 1 | Example 2 | Comparative Example 1 | Comparative Example 2 |
|---|---|---|---|---|
| Urethane acrylate oligomer UA1 | 40.0 | — | 40.0 | — |
| Urethane acrylate oligomer UA2 | — | 38.0 | — | 38.0 |
| Styrene monomer | 10.0 | 12.0 | 10.0 | 12.0 |
| Zinc stearate | 1.45 | 1.3 | 1.45 | 1.3 |
| Titanium oxide | 48.0 | 48.0 | 48.0 | 48.0 |
| t-Butyl catechol | 0.05 | 0.1 | 0.05 | 0.1 |
| 8% cobalt octylate | 0.5 | 0.6 | 0.5 | 0.6 |
| Total | 100.0 | 100.0 | 100.0 | 100.0 |
| Aliphatic polyisocyanate | 3.0 | 1.0 | 0 | 0 |
| t-Butyl peroxybenzoate | 2.0 | 2.0 | 2.0 | 2.0 |

In Table 1,urethane acrylate oligomer UA1 is an urethane methacrylate oligomer prepared from 500 parts by weight of bis(4-isocyanatophenyl)methane, 1,000 parts by weight of an ethylene oxide adduct (average molecular weight: 1,000) of 2,2-bis(4-hydroxylphenyl) and 273 parts by weight of 2-hydroxyethyl methacrylate (molar ratio of 1:2.1). Urethane acrylate oligomer UA2 is a urethane methacrylate oligomer prepared from 349 parts by weight of 2,4- and 2,6-toluene diisocyanate, 1,000 parts by weight of polypropylene glycol (average molecular weight:1,000), and 233 parts by weight of 2-hydroxyethyl acrylate (molar ratio of 2:1:2.1). The aliphatic polyisocyanate was hexamethylene diisocyanate of a burette type.

The thermoplastic resin molding material employed was a polyamide resin NOVAMID 1013C, a polyester resin (PBT) NOVADUR 5010R5, or a polyester type alloy material PC/PET alloy Iupilon MB2112, manufactured by Mitsubishi Engineering Plastics Company Limited.

Further, as a modified resin, the following resin was used in an amount of 3 parts by weight per 100 parts by weight of the above resin and mixed by means of a melt kneading apparatus to obtain a thermoplastic resin molding material.

1. SMA2625 having a part of a styrene/maleic acid copolymer resin esterified (hereinafter referred to as SMA2625, manufactured by Arco Chemical Company Limited),
2. An ethylene/methacrylic acid copolymer Nuclel N2060 (hereinafter referred to as N2060, manufactured by Mitsui.Du Pont Polychemical Company Limited),
3. A vinylester resin Ripoxy VR60 (hereinafter referred to as VR60, manufactured by Showa High Polymer Co., Ltd.),
4. Polyethylene/polyvinyl alcohol copolymer Eval EP-F101A (hereinafter referred to as EP-F101A, manufactured by Kuraray Co., Ltd.),
5. A butyral resin EslecB BL-S (hereinafter referred to as BL-S, manufactured by Sekisui Chemical industry Company Limited),
6. A thermoplastic acryl resin Dianal BR resin BR-77 (hereinafter referred to as BR-77, manufactured by Mitsubishi Rayon Company Limited),
7. An acid modified acryl/polystyrene polymer which is a graft polymer having a comb structure Rezeda GP-400 (hereinafter referred to as GP-400, manufactured by Toa Gosei Chemical Industries Company Limited),
8. An epoxy modified polystyrene/polystylene polymer which is graft polymer having a comb structure Rezeda GP-500 (hereinafter referred to as GP-500, manufactured by Toa Gosei Chemical Industries Company Limited),
9. An ethylene/acrylate copolymer having maleic anhydride grafted HPR AR201 (hereinafter referred to as AR201, manufactured by Mitsui-Du Pont Polychemical Company Limited),
10. A modified ether-type polyester resin Stafics P-LC (hereinafter referred to as P-LC, manufactured by Fuji Photofilm Company Limited), and
11. An ethylene/glycidyl methacrylate copolymer having polystyrene grafted Modiper A4100 (hereinafter referred to as A4100, manufactured by Nipon Oil and Fats Company Limited)

Examples 1 and 2 and Comparative Examples 1 and 2

As the injection molding apparatus and the mold, IS100 injection molding apparatus, manufactured by Toshiba Kikai K. K., was used, the cavity configuration was a box type of about 100 mm in length×about 30 mm in width×about 10 mm in depth with a wall thickness of 2 mm. The mold was closed, and clamping of the mold was carried out with a clamping force of 100 tonf. While maintaining the clamping force, the above mentioned thermoplastic resin molding material, or a thermoplastic resin molding material having a modified resin melt-mixed thereto, was melted and injected by the injection machine into the mold cavity. The injection molding conditions were as follows.

Mold temperature:
Movable mold half: 120° C.
Fixed mold half: 120° C.
In the case where NOVAMID 1013C was used
Injection pressure: 800 kgf/cm$^2$
Pressure-maintaining pressure: 400 kgf/cm$^2$
Pressure-maintaining period of time: 10 seconds
In the case where NOVADUR 5010R5 was used
Injection pressure: 1,000 kgf/cm$^2$
Pressure-maintaining pressure: 600 kgf/cm$^2$
Pressure-maintaining period of time: 10 seconds
In the case where Iupilon MB2112 was used
Injection pressure: 1,000 kgf/cm$^2$
Pressure-maintaining pressure: 500 kgf/cm$^2$
pressure-maintaining period of time: 10 seconds In the cases where NOVAMID 1013C and NOVADUR 5010R5 were used, the coating composition was injected under an injection pressure higher than in-mold pressure immediately after completion of the pressure-maintaining step without forming a space between the molded product and the inner all of the mold. Whereas, in the case where Iupilon MB2112 was used, after 50 seconds from completion of the pressure-maintaining step, the mold clamping force was reduced to about 5 tonf to form a space between the molded product and the inner wall of the mold, whereupon the coating composition was injected into the space. Further, the conditions under which the coating composition was injected, were as follows in each case.

Mold temperature:
Movable mold half: 120° C.
Fixed mold half: 120° C.
The amount of the coating composition: 3 cm$^3$
Injection time: 1.5 seconds
Curing time: 70 seconds After 70 seconds from the injection of the coating composition, the thermoplastic resin molded product was taken out from the mold to obtain a coated molded product having an average coating film thickness of 50 µm.

The following properties of such coated molded products were evaluated by the following methods.

Adhesive property: In accordance with JIS K5400, a 2 mm crosscut adhesive tape peeling test was carried out (represented by the number of crosscut sections remaining unpeeled out of 100 crosscut sections).

60° specular gloss: Measured by digital variable angle gloss meter UGV-5D, manufactured by Suga Shikenki K. K.

Gloss-maintaining ratio: The ratio of the gloss after 1,000 hours of SWOM to the initial gloss (gloss maintaining ratio (%)=(gloss after 1,000 hours of SWOM/initial gloss)×100)

Color difference: Color difference ΔE after 1,000 hours of SWOM.

Weather resistance: Measured by Sunshine Super-long Life Weatherometer, manufactured by Suga Shikenki K. K.

Solvent resistance: MEK rubbing test (the coated film surface was wiped 10 times under a force of 500 gf with a gauze having a proper amount of methyl ethyl ketone absorbed, whereupon the state of the coating film was inspected).

These results are shown in Tables 2 to 8.

TABLE 2

Adhesive property of in-molded coating by polyamide resin NOVAMID 1013C

| | Molding material base 1013C | Amount (wt %) | Example 1 | Example 2 | Comparative Exampel 1 | Comparative Exampel 2 |
|---|---|---|---|---|---|---|
| 1 | Not added | 0 | 100/100 | 90/100 | 0/100 | 0/100 |
| | | | 100/100 | 85/100 | 0/100 | 0/100 |
| 2 | SMA2625 | 3 | 100/100 | 100/100 | 0/100 | 0/100 |
| | | | 100/100 | 100/100 | 0/100 | 0/100 |
| 3 | N2060 | 3 | 100/100 | 100/100 | 0/100 | 0/100 |
| | | | 100/100 | 100/100 | 0/100 | 0/100 |
| 4 | VR60 | 3 | 100/100 | 100/100 | 0/100 | 0/100 |
| | | | 100/100 | 100/100 | 0/100 | 0/100 |
| 5 | EP-F101A | 3 | 100/100 | 100/100 | 0/100 | 0/100 |
| | | | 100/100 | 100/100 | 0/100 | 0/100 |
| 6 | BL-S | 3 | 100/100 | 100/100 | 0/100 | 0/100 |
| | | | 100/100 | 100/100 | 0/100 | 0/100 |
| 7 | BR-77 | 3 | 100/100 | 100/100 | 0/100 | 0/100 |
| | | | 100/100 | 100/100 | 0/100 | 0/100 |
| 8 | GP-400 | 3 | 100/100 | 100/100 | 0/100 | 0/100 |
| | | | 100/100 | 100/100 | 0/100 | 0/100 |
| 9 | GP-500 | 3 | 100/100 | 100/100 | 0/100 | 0/100 |
| | | | 100/100 | 100/100 | 0/100 | 0/100 |
| 10 | AR201 | 3 | 100/100 | 100/100 | 0/100 | 0/100 |
| | | | 100/100 | 100/100 | 0/100 | 0/100 |
| 11 | P-LC | 3 | 100/100 | 100/100 | 0/100 | 0/100 |
| | | | 100/100 | 100/100 | 0/100 | 0/100 |
| 12 | A4100 | 3 | 100/100 | 100/100 | 0/100 | 0/100 |
| | | | 100/100 | 100/100 | 0/100 | 0/100 |

*Evaluation of adhesive property
Upper result: Initial evaluation of adhesion
Lower result: Evaluated after immersion in warm water of 40° C. for 240 hours

TABLE 3

Adhesive property of in-mold coating by polyester resin (PBT resin) NOVADUR 5010R5

| | Molding material base 5010R5 | Amount (wt %) | Example 1 | Example 2 | Comparative Example 1 | Comparative Example 2 |
|---|---|---|---|---|---|---|
| 1 | Not added | — | 100/100 | 75/100 | 0/100 | 0/100 |
| | | | 100/100 | 70/100 | 0/100 | 0/100 |
| 2 | SMA2625 | 3 | 100/100 | 100/100 | 0/100 | 0/100 |
| | | | 100/100 | 100/100 | 0/100 | 0/100 |
| 3 | N2060 | 3 | 100/100 | 100/100 | 0/100 | 0/100 |
| | | | 100/100 | 100/100 | 0/100 | 0/100 |

*Evaluation of adhesive property
Upper result: Initial evaluation of adhesion
Lower result: Evaluation after immersion in warm water of 40° C. for 240 hours

TABLE 4

Adhesive property of in-mold coating by polyester resin type alloy (PC/PET resin) Iupilon MB2112

| | Molding material base MB2112 | Amount (wt %) | Example 1 | Example 2 | Comparative Exampel 1 | Comparative Exampel 2 |
|---|---|---|---|---|---|---|
| 1 | Not added | — | 100/100 | 100/100 | 0/100 | 0/100 |
| | | | 100/100 | 100/100 | 0/100 | 0/100 |
| 2 | SMA2625 | 3 | 100/100 | 100/100 | 0/100 | 0/100 |
| | | | 100/100 | 100/100 | 0/100 | 0/100 |
| 3 | N2060 | 3 | 100/100 | 100/100 | 0/100 | 0/100 |
| | | | 100/100 | 100/100 | 0/100 | 0/100 |

*Evaluation of adhesive property
Upper result: Initial evaluation of adhesion
Lower result: Evaluated after immersion in warm water of 40° C. for 240 hours

TABLE 5

Coating film properties (60° specular gloss, gloss-maintaining ratio, color difference, solvent resistance) of the in-mold containing composition by polyamide resin NOVAMID 1013C

| | | Example 1 | | | Example 2 | | |
|---|---|---|---|---|---|---|---|
| Molding material base 1013C | Amount (wt %) | Gloss/ Gloss-maintaining ratio | Color difference | Solvent resistance | Gloss/ Gloss-maintaining ratio | Color difference | Solvent resistance |
| 1 Not added | — | 87/70 | 1.5 | No change | 87/68 | 1.9 | No change |
| 2 SMA2625 | 3 | 87/74 | 1.4 | No change | 88/72 | 2.0 | No change |
| 3 N2060 | 3 | 89/75 | 1.5 | No change | 88/71 | 2.1 | No change |
| 4 VR60 | 3 | 86/73 | 1.5 | No change | 86/71 | 2.0 | No change |
| 5 EP-F101A | 3 | 88/76 | 1.5 | No change | 85/72 | 1.9 | No change |
| 6 BL-S | 3 | 86/77 | 1.7 | No change | 87/74 | 2.1 | No change |
| 7 BR-77 | 3 | 86/76 | 1.4 | No change | 85/72 | 2.1 | No change |
| 8 GP-400 | 3 | 88/76 | 1.7 | No change | 87/73 | 1.9 | No change |
| 9 GP-500 | 3 | 89/74 | 1.5 | No change | 88/74 | 1.8 | No change |
| 10 AR201 | 3 | 87/77 | 1.6 | No change | 88/76 | 2.2 | No change |
| 11 P-LC | 3 | 88/74 | 1.6 | No change | 87/74 | 2.0 | No change |
| 12 A4100 | 3 | 86/73 | 1.5 | No change | 85/70 | 2.1 | No change |

TABLE 6

Coating film properties (60° specular gloss, gloss-maintaining ratio, color difference, solvent resistance) of the in-mold containing composition by polyamide resin NOVAMID 1013C

| | | Comparative Example 1 | | | Comparative Example 2 | | |
|---|---|---|---|---|---|---|---|
| Molding material base 1013C | Amount (wt %) | Gloss/ Gloss-maintaining ratio | Color difference | Solvent resistance | Gloss/ Gloss-maintaining ratio | Color difference | Solvent resistance |
| 1 Not added | — | 87/55 | 3.0 | Gloss decreased | 85/40 | 4.0 | Gloss decreased |
| 2 SMA2625 | 3 | 87/50 | 3.5 | Gloss decreased | 84/35 | 3.9 | Gloss decreased |
| 3 N2060 | 3 | 85/53 | 3.3 | Gloss decreased | 85/38 | 4.0 | Gloss decreased |
| 4 VR60 | 3 | 87/56 | 3.1 | Gloss decreased | 85/41 | 4.1 | Gloss decreased |
| 5 EP-F101A | 3 | 86/52 | 3.4 | Gloss decreased | 85/40 | 4.0 | Gloss decreased |
| 6 BL-S | 3 | 86/50 | 2.9 | Gloss decreased | 86/39 | 3.8 | Gloss decreased |
| 7 BR-77 | 3 | 88/55 | 3.0 | Gloss decreased | 85/36 | 4.2 | Gloss decreased |
| 8 GP-400 | 3 | 88/50 | 3.1 | Gloss decreased | 84/41 | 4.0 | Gloss decreased |
| 9 GP-500 | 3 | 88/55 | 3.2 | Gloss decreased | 85/40 | 4.3 | Gloss decreased |
| 10 AR201 | 3 | 86/50 | 3.4 | Gloss decreased | 84/39 | 4.5 | Gloss decreased |
| 11 P-LC | 3 | 87/54 | 3.0 | Gloss decreased | 87/40 | 3.9 | Gloss decreased |
| 12 A4100 | 3 | 87/51 | 3.0 | Gloss decreased | 86/36 | 3.9 | Gloss decreased |

TABLE 7

Coating film properties (60° specular gloss, gloss-maintaining ratio, color difference, solvent resistance) of the in-mold containing composition by polyester resin NOVADUR 5010R5

| Molding material base 5010R5 | Amount (wt %) | Example 1 Gloss/Gloss-maintaining ratio | Color difference | Solvent resistance | Example 2 Gloss/Gloss-maintaining ratio | Color difference | Solvent resistance |
| --- | --- | --- | --- | --- | --- | --- | --- |
| 1 Not added | — | 87/74 | 1.8 | No change | 88/72 | 1.9 | No change |
| 2 SMA2625 | 3 | 89/75 | 1.6 | No change | 85/70 | 2.0 | No change |
| 3 N2060 | 3 | 87/73 | 1.7 | No change | 87/73 | 1.8 | No change |

TABLE 8

Coating film properties (60° specular gloss, gloss-maintaining ratio, color difference, solvent resistance) of the in-mold containing composition by polyester resin NOVADUR 5010R5

| Molding material base 5010R5 | Amount (wt %) | Comparative Example 1 Gloss/Gloss-maintaining ratio | Color difference | Solvent resistance | Comparative Example 2 Gloss/Gloss-maintaining ratio | Color difference | Solvent resistance |
| --- | --- | --- | --- | --- | --- | --- | --- |
| 1 Not added | — | 88/55 | 3.0 | Gloss decreased | 87/41 | 4.1 | Gloss decreased |
| 2 SMA2625 | 3 | 86/54 | 3.3 | Gloss decreased | 86/40 | 4.5 | Gloss decreased |
| 3 N2060 | 3 | 88/50 | 3.3 | Gloss decreased | 87/37 | 3.9 | Gloss decreased |

Examples 3 and 4 and Comparative Examples 3 to 7

As the injection molding apparatus and the mold, IS100 injection molding apparatus, manufactured by Toshiba Kikai K. K., was used, the cavity configuration was a box type of about 100 mm in length×about 30 mm in width×about 10 mm in depth with a wall thickness of 2 mm. The mold was closed, and clamping of the mold was carried out with a mold clamping force of 100 tonf. While maintaining the mold clamping force, the thermoplastic resin molding material (containing no modified resin) as identified in Table 9, was melted and injected by the injection molding machine into the mold cavity at a mold temperature of 120° C., under an injection pressure of 800 kgf/cm² in Example 3 and in Comparative Examples 3 to 5, or under an injection pressure of 1,000 kgf/cm² in Example 4 and in Comparative Examples 6 and 7. The injection molding conditions were as shown in Table 9.

When the pressure-maintaining step was completed, in Examples 3 and 4, the coating composition was injected under an injection pressure higher than the in-mold pressure without forming a space between the surface of the thermoplastic resin molded product to be coated and the inner wall of the mold. The conditions were as follows.

Mold temperature:
Movable mold half: 120° C.
Fixed mold half: 120° C.
The amount of the coating composition: 3 cm³
Injection time: 1.5 seconds
Curing time: 70 seconds After 70 seconds from the injection of the coating composition, the thermoplastic resin molded product was taken out from the mold to obtain a coated molded product having an average coating film thickness of 50 μm.

In Comparative Examples 3 to 7, in order to adjust the in-mold pressure immediately prior to the injection of the coating composition to a level of 0 kgf/cm²:

1. The pressure-maintaining pressure, the pressure-maintaining period of time or the timing for injecting the coating composition was changed to a form a space between the surface of the molded product to be coated and the inner wall of the mold, and then the coating composition was injected into the space, or
2. The movable mold half was parted to form a space between the surface of the molded product to be coated and the inner wall of the mold, and then the coating composition was injected into the space, to form a coating film.

After 70 seconds from the injection of the coating composition, the thermoplastic resin molded product was taken out, to obtain a coated molded product having an average coating film thickness of 50 μm.

The appearance, the adhesive property after immersion in warm water and the adhesive property after 1,000 hours of SWOM of a such a coated molded product, were as shown in Table 9. Further, with respect to the appearance of the molded product, when the pressure-maintaining pressure was low, sink marks tended to form.

TABLE 9

Appearance and coating film properties by the in-mold coating composition (Example 1) due to the difference in the in-mold pressure

| | Example 3 | Example 4 | Comparative Example 3 | Comparative Example 4 | Comparative Example 5 | Comparative Example 6 | Comparative Example 7 |
|---|---|---|---|---|---|---|---|
| Molding material | 1013C | 5010R5 | 1013C | 1013C | 1013C | 5010R5 | 5010R5 |
| Pressure-maintaining pressure (kgf/cm$^2$) | 400 | 600 | 400 | 200 | 200 | 600 | 200 |
| Pressure-maintaining time (sec.) | 10 | 10 | 10 | 6 | 6 | 10 | 6 |
| Timing of injection (sec.) *1 | 0 | 0 | 0 | 0 | 30 | 0 | 0 |
| Mold movement (μm) *2 | No | No | 100 | No | No | 100 | No |
| In-mold pressure (kgf/cm$^2$) *3 | 50 | 90 | 0 | 0 | 0 | 0 | 0 |
| Injection pressure (kgf/cm$^2$) *4 | 280 | 350 | 70 | 230 | 150 | 80 | 250 |
| Mold movement (μm) *5 | 5 | 10 | 5 | 0 | 5 | 5 | 0 |
| In-mold pressure (kgf/cm$^2$) *6 | 60 | 170 | 0 | 0 | 0 | 0 | 0 |
| Appearance of coating film | Normal | Normal | Normal | Wrinkles partly formed | Normal | Normal | Wrinkles partly formed |
| Adhesive property after immersion in warm water *7 | 100/100 | 100/100 | 95/100 | 80/100 | 90/100 | 95/100 | 80/100 |
| Adhesive property after 1,000 hrs. of SWOM | 100/100 | 100/100 | 98/100 | 90/100 | 80/100 | 95/100 | 97/100 |

*1: The time until the coating composition was injected after completion of the pressure maintaining step.
*2: Whether or not the mold was moved immediately prior to the injection.
*3: The in-mold pressure immediately prior to the injection of the coating composition.
*4: The maximum injection pressure at the time of injecting the coating composition.
*5: Mold movement immediately after the injection of the coating composition.
*6: In-mold pressure immediately prior to the mold releasing.
*7: The number of crosscut sections remaining by the 2mm crosscut peeling test after immersion in warm water (40° C. for 200 hours).

The compositions (parts by weight) of the in-mold coating compositions used in the following Examples 5 to and Comparative Examples 8 to 13 using urethane (meth) acrylate oligomers having aliphatic cyclic structures, were as shown in Table 10.

TABLE 10

| Component | Example 5 | Example 6 | Comparative Example 8 |
|---|---|---|---|
| Urethane acrylate UA3 having a cyclic structure | 45.0 | — | 45.0 |
| Urethane acrylate UA4 having a cyclic structure | — | 48.0 | — |
| Styrene monomer | 8.0 | 6.0 | 8.0 |
| Zinc stearate | 1.45 | 1.45 | 1.45 |
| Titanium dioxide | 45.0 | 44.0 | 45.0 |
| t-Butyl catechol | 0.05 | 0.05 | 0.05 |
| 8% cobalt octylate | 0.5 | 0.5 | 0.5 |
| Total | 100.0 | 100.0 | 100.0 |
| Aliphatic polyisocyanate | 3.0 | 0.5 | 0 |
| t-Butyl peroxybenzoate | 2.0 | 2.0 | 2.0 |

In Table 10, urethane acrylate UA3 having a cyclic structure is a urethane acrylate oligomer prepared from 666 parts by weight of 3-isocyanatomethyl-3,5,5-trimethylcyclohexyl isocyanate, 240 parts by weight of 2,2-bis(4-hydroxycyclohexyl)propane and 244 parts by weight of 2-hydroxyethyl acrylate (molar ratio of 3:1:4.1).

Urethane acrylate UA4 having a cyclic structure is a urethane methacrylate oligomer prepared from 524 parts by weight of bis(4-isocyanatocyclohexyl)methane, 1,000 parts by weight of an ethylene oxide adduct (average molecular weight 1,000) of 2,2-bis(4-hydroxycyclohexyl)propane and 273 parts by weight of 2-hydroxyethyl methacrylate (molar ratio of 2:1:2.1).

The aliphatic polyisocyanate is hexamethylene diisocyanate of a burette type.

The thermoplastic resin molding material employed, was the same as used in the foregoing Examples 1 to 4 and Comparative Examples 1 to 7. Examples 5 and 6 and Comparative Example 8

As the injection molding apparatus and the mold, IS100 injection molding apparatus, manufactured by Toshiba Kikai K. K., was employed. The cavity configuration was a box type of about 100 mm in length×about 30 mm in width× about 10 mm in depth, with a wall thickness of 2 mm. The mold was closed, and clamping of the mold was carried out with a mold clamping force of 100 tonf. While maintaining the clamping force, the above thermoplastic resin molding material or a thermoplastic resin molding material having a modified resin melt-kneaded thereto, was melted and injected by the injection molding machine into the mold cavity. The injection molding conditions were as follows.

Mold temperature:
Movable mold half: 120° C.
Fixed mold half: 120° C.
In the case where NOVAMID 1013C was used
Injection pressure: 800 kgf/cm$^2$
Pressure-maintaining pressure: 400 kgf/cm$^2$
Pressure-maintaining period of time: 10 seconds
In the case where NOVADUR 5010R5 was used
Injection pressure: 1,000 kgf/cm$^2$
Pressure-maintaining pressure: 600 kgf/cm$^2$
Pressure-maintaining period of time: 10 seconds
In the case where Iupilon MB2112 was used
Injection pressure: 1,000 kgf/cm$^2$
Pressure-maintaining pressure: 500 kgf/cm$^2$
Pressure-maintaining period of time: 10 seconds In the cases where NOVAMID 1013C and NOVADUR 5010R5 were used, immediately after completion of the pressure-maintaining step, the coating composition was injected under an injection pressure higher than the in-mold pressure without forming a space between the molded product and the inner wall of the mold. Whereas, in the case where Iupilon MB2112 was employed, after 50 seconds from completion of the pressure-maintaining step, the mold clamping force was reduced to about 5 tonf to form a space between the molded product and the inner wall of the mold, and the coating composition was injected into the space. Further, in each case, the conditions for injection of the coating composition were as follows.

Mold temperature:
Movable mold half: 120° C.
Fixed mold half: 120° C.
The amount of the coating composition: 3 cm$^3$
Injection time: 1.5 seconds
Curing time: 70 seconds After 70 seconds from the injection of the coating composition, the thermoplastic resin molded product was taken out from the mold to obtain a coated molded product having an average coating film thickness of 50 μm.

The properties of such coated molded products were as shown in Tables 11 to 17. The methods for evaluating such properties were the same as in Examples 1 to 4 and Comparative Examples 1 to 7.

TABLE 11

Adhesive property of in-mold coating by polyamide resin NOVAMID 1013C

| | Molding material base 1013C | Amount (wt %) | Example 5 | Example 6 | Comparative Example 8 |
|---|---|---|---|---|---|
| 1 | Not added | 0 | 100/100 | 95/100 | 0/100 |
| | | | 100/100 | 95/100 | 0/100 |
| 2 | SMA2625 | 3 | 100/100 | 100/100 | 0/100 |
| | | | 100/100 | 100/100 | 0/100 |
| 3 | N2060 | 3 | 100/100 | 100/100 | 0/100 |
| | | | 100/100 | 100/100 | 0/100 |
| 4 | VR60 | 3 | 100/100 | 100/100 | 0/100 |
| | | | 100/100 | 100/100 | 0/100 |
| 5 | EP-F101A | 3 | 100/100 | 100/100 | 0/100 |
| | | | 100/100 | 100/100 | 0/100 |
| 6 | BL-S | 3 | 100/100 | 100/100 | 0/100 |
| | | | 100/100 | 100/100 | 0/100 |

TABLE 11-continued

Adhesive property of in-mold coating by polyamide resin NOVAMID 1013C

| | Molding material base 1013C | Amount (wt %) | Example 5 | Example 6 | Comparative Example 8 |
|---|---|---|---|---|---|
| 7 | BR-77 | 3 | 100/100 | 100/100 | 0/100 |
| | | | 100/100 | 100/100 | 0/100 |
| 8 | GP-400 | 3 | 100/100 | 100/100 | 0/100 |
| | | | 100/100 | 100/100 | 0/100 |
| 9 | GP-500 | 3 | 100/100 | 100/100 | 0/100 |
| | | | 100/100 | 100/100 | 0/100 |
| 10 | AR201 | 3 | 100/100 | 100/100 | 0/100 |
| | | | 100/100 | 100/100 | 0/100 |
| 11 | P-LC | 3 | 100/100 | 100/100 | 0/100 |
| | | | 100/100 | 100/100 | 0/100 |
| 12 | A4100 | 3 | 100/100 | 100/100 | 0/100 |
| | | | 100/100 | 100/100 | 0/100 |

*Evaluation of adhesive property
Upper result: Initial evaluation of adhesion
Lower result: Evaluated after immersion in warm water of 40° C. for 240 hours

TABLE 12

Adhesive property of in-mold coating by polyester resin (PTB resin) NOVADUR 5010R5

| | Molding material base 5010R5 | Amount (wt %) | Example 5 | Example 6 | Comparative Example 8 |
|---|---|---|---|---|---|
| 1 | Not added | — | 100/100 | 90/100 | 0/100 |
| | | | 100/100 | 95/100 | 0/100 |
| 2 | SMA2625 | 3 | 100/100 | 100/100 | 0/100 |
| | | | 100/100 | 100/100 | 0/100 |
| 3 | N2060 | 3 | 100/100 | 100/100 | 0/100 |
| | | | 100/100 | 100/100 | 0/100 |

*Evaluation of adhesive property
Upper result: Initial evaluation of adhesion
Lower result: Evaluated after immersion in warm water of 40° C. for 240 hours

TABLE 13

Adhesive property of in-mold coating by polyester resin type alloy (PC/PET resin) Iupilon MB2112

| | Molding material base MB2112 | Amount (wt %) | Example 5 | Example 6 | Comparative Example 8 |
|---|---|---|---|---|---|
| 1 | Not added | — | 100/100 | 100/100 | 0/100 |
| | | | 100/100 | 100/100 | 0/100 |
| 2 | SMA2625 | 3 | 100/100 | 100/100 | 0/100 |
| | | | 100/100 | 100/100 | 0/100 |
| 3 | N2060 | 3 | 100/100 | 100/100 | 0/100 |
| | | | 100/100 | 100/100 | 0/100 |

*Evaluation of adhesive property
Upper result: Initial evaluation of adhesion
Lower result: Evaluated after immersion in warm water of 40° C. for 240 hours

TABLE 14

Coating film properties (60° specular gloss, gloss-maintaining ratio, color difference, solvent resistance) of the in-mold coating composition by polyamide resin NOVAMID 1013C

| | | Example 5 | | | Example 6 | | |
|---|---|---|---|---|---|---|---|
| Molding material base 1013C | Amount (wt %) | Gloss/Gloss-maintaining ratio | Color difference | Solvent resistance | Gloss/Gloss-maintaining ratio | Color difference | Solvent resistance |
| 1 Not added | — | 88/95 | 0.5 | No change | 86/90 | 0.8 | No change |
| 2 SMA2625 | 3 | 87/94 | 0.5 | No change | 87/92 | 0.8 | No change |
| 3 N2060 | 3 | 86/97 | 0.6 | No change | 83/93 | 0.8 | No change |
| 4 VR60 | 3 | 87/95 | 0.5 | No change | 85/91 | 0.7 | No change |
| 5 EP-F101A | 3 | 87/95 | 0.7 | No change | 83/92 | 0.8 | No change |
| 6 BL-S | 3 | 89/95 | 0.6 | No change | 88/91 | 0.9 | No change |
| 7 BR-77 | 3 | 88/96 | 0.5 | No change | 86/90 | 0.8 | No change |
| 8 GP-400 | 3 | 87/95 | 0.6 | No change | 87/91 | 0.8 | No change |
| 9 GP-500 | 3 | 88/94 | 0.7 | No change | 87/92 | 0.7 | No change |
| 10 AR201 | 3 | 88/95 | 0.6 | No change | 86/92 | 0.8 | No change |
| 11 P-LC | 3 | 87/95 | 0.5 | No change | 88/91 | 0.8 | No change |
| 12 A4100 | 3 | 89/92 | 0.5 | No change | 86/90 | 0.9 | No change |

TABLE 15

Coating film properties (60° specular gloss, gloss-maintaining ratio, color difference, solvent resistance) of the in-mold coating composition by polyamide resin NOVAMID 1013C

| | | Comparative Example 8 | | |
|---|---|---|---|---|
| Molding material base 1013C | Amount (wt %) | Gloss/Gloss-maintaining ratio | Color difference | Solvent resistance |
| 1 Not added | — | 87/80 | 1.5 | Gloss decreased |
| 2 SMA2625 | 3 | 86/82 | 1.4 | Gloss decreased |
| 3 N2060 | 3 | 86/80 | 1.5 | Gloss decreased |
| 4 VR60 | 3 | 87/81 | 1.5 | Gloss decreased |
| 5 EP-F101A | 3 | 88/82 | 1.6 | Gloss decreased |
| 6 BL-S | 3 | 89/80 | 1.5 | Gloss decreased |
| 7 BR-77 | 3 | 86/80 | 1.4 | Gloss decreased |
| 8 GP-400 | 3 | 88/79 | 1.5 | Gloss decreased |
| 9 GP-500 | 3 | 88/78 | 1.6 | Gloss decreased |
| 10 AR201 | 3 | 85/81 | 1.5 | Gloss decreased |
| 11 P-LC | 3 | 86/82 | 1.5 | Gloss decreased |
| 12 A4100 | 3 | 87/79 | 1.6 | Gloss decreased |

TABLE 16

Coating film properties (60° specular gloss, gloss-maintaining ratio, color difference, solvent resistance) of the in-mold coating composition by polyester resin NOVADUR 5010R5

| | | Example 5 | | | Example 6 | | |
|---|---|---|---|---|---|---|---|
| Molding material base 5010R5 | Amount (wt %) | Gloss/Gloss-maintaining ratio | Color difference | Solvent resistance | Gloss/Gloss-maintaining ratio | Color difference | Solvent resistance |
| 1 Not added | — | 87/95 | 0.6 | No change | 88/89 | 0.9 | No change |
| 2 SMA2625 | 3 | 89/95 | 0.5 | No change | 87/91 | 1.1 | No change |
| 3 N2060 | 3 | 87/95 | 0.7 | No change | 87/90 | 1.1 | No change |

TABLE 17

Coating film properties (60° specular gloss, gloss-maintaining ratio, color difference, solvent resistance) of the in-mold coating composition by polyester resin NOVADUR 5010R5

|   | Molding material base 5010R5 | Amount (wt %) | Comparative Example 8 | | |
|---|---|---|---|---|---|
|   |   |   | Gloss/ Gloss-maintaining ratio | Color difference | Solvent resistance |
| 1 | Not added | — | 88/82 | 1.3 | Gloss decreased |
| 2 | SMA2625 | 3 | 88/81 | 1.3 | Gloss decreased |
| 3 | N2060 | 3 | 86/83 | 1.5 | Gloss decreased |

Examples 7 and 8 and Comparative Examples 9 to 13

As the injection molding apparatus and the mold, IS100 injection molding apparatus manufactured by Toshiba Kikai K. K., was employed. The cavity configuration was a box type about 100 mm in length×about 30 mm in width×about 10 mm in depth, with a wall thickness of 2 mm. The mold was closed, and clamping of the mold was carried out with a mold clamping force of 100 tonf. While maintaining the mold clamping force, the thermoplastic resin molding material (containing no modified resin) as identified in Table 18, was melted and injected by the injection molding machine into the mold cavity at a mold temperature of 120° C., under an injection pressure of 800 kgf/cm² in Example 7 and in Comparative Examples 9 to 11 or under an injection pressure of 1,000 kgf/cm² in Example 8 and in Comparative Examples 12 and 13. The injection molding conditions were as shown in Table 18.

After completion of the pressure-maintaining step, in Examples 7 and 8, the coating composition was injected under an injection pressure higher than the in-mold pressure without forming a space between the surface of the thermoplastic resin molded product to be coated and the inner wall of the mold. The conditions were as follows.

Mold temperature:
  Movable mold half: 120° C.
  Fixed mold half: 120° C.
The amount of the coating composition: 3 cm³
Injection time: 1.5 seconds
Curing time: 70 seconds After 70 seconds from the injection of the coating composition, the thermoplastic resin molded product was taken out form the mold to obtain a coated molded product having an average coating film thickness of 50 μm.

In Comparative Examples 9 to 13, in order to bring the in-mold pressure immediately prior to the injection of the coating composition to a level of 0 kgf/cm²:

1. The pressure-maintaining pressure, the pressure-maintaining period of time or the timing for injection of the coating composition was changed to a form a space between the surface of the molded product to be coated and the inner wall of the mold, and then the coating composition was injected into the space, or
2. The movable mold half was parted to form a space between the surface of the molded product to be coated and the inner wall of the mold, and then the coating composition was injected into the space, to form a coating film.

After 70 seconds from injection of the coating composition, the thermoplastic resin molded product was taken out from the mold to obtain a coated molded product having an average coating film thickness of 50 μm.

The appearance of the coating film, the adhesion property after immersion in warm water and the adhesion property after 1,000 hours of SWOM of such a coated molded product were as shown in Table 18. Further, with respect to the appearance of the molded product, sink marks tended to form when the pressure-maintaining pressure was low.

TABLE 18

Appearance and coating film properties by the in-mold coating composition (Example 1) due to the difference in the in-mold pressure

|   | Example 7 | Example 8 | Comparative Example 8 | Comparative Example 10 | Comparative Example 11 | Comparative Example 12 | Comparative Example 13 |
|---|---|---|---|---|---|---|---|
| Molding material | 1013C | 5010R5 | 1013C | 1013C | 1013C | 5010R5 | 5010R5 |
| Pressure-maintaining time (kgf/cm²) | 400 | 600 | 400 | 200 | 200 | 600 | 200 |
| Pressure-maintaining time (sec.) | 10 | 10 | 10 | 6 | 6 | 10 | 6 |
| Timing of injection (sec.) *1 | 0 | 0 | 0 | 0 | 30 | 0 | 0 |
| Mold movement (μm) *2 | No | No | 100 | No | No | 100 | No |
| In-mold pressure (kgf/cm²) *3 | 50 | 90 | 0 | 0 | 0 | 0 | 0 |
| Injection pressure (kgf/cm²) *4 | 280 | 350 | 70 | 230 | 150 | 80 | 250 |
| Mold movement (μm) *5 | 5 | 10 | 5 | 0 | 5 | 5 | 0 |
| In-mold pressure | 60 | 170 | 0 | 0 | 0 | 0 | 0 |

TABLE 18-continued

Appearance and coating film properties by the in-mold coating composition (Example 1) due to the difference in the in-mold pressure

|  | Example 7 | Example 8 | Comparative Example 8 | Comparative Example 10 | Comparative Example 11 | Comparative Example 12 | Comparative Example 13 |
|---|---|---|---|---|---|---|---|
| (kgf/cm$^2$) *6 |  |  |  |  |  |  |  |
| Appearance of coating film | Normal | Normal | Normal | Wrinkles partly formed | Normal | Normal | Wrinkles partly formed |
| Adhesive property after immersion in warm water *7 | 100/100 | 100/100 | 95/100 | 80/100 | 90/100 | 95/100 | 80/100 |
| Adhesive property after 1,000 hrs. of SWOM | 100/100 | 100/100 | 98/100 | 90/100 | 80/100 | 95/100 | 97/100 |

*1: The time until the coating composition is injected after completion of the pressure maintaining.
*2: Whether or not the mold was moved immediately prior to the injection.
*3: The in-mold pressure immediately prior to the injection of the coating composition.
*4: The maximum injection pressure at the time of injecting the coating composition.
*5: Mold movement immediately after the injection of the coating composition.
*6: In-mold pressure immediately prior to the mold releasing.
*7: The number of crosscut sections remaining by the 2mm crosscut peeling test after immersion in warm water (40° C. for 200 hours).

As described in the foregoing, according to the present invention, it is possible to form a single in-mold coating film which is excellent in the adhesive property, the appearance, the weather resistance and the solvent resistance and which has a function also as a top coating applicable to automobile exterior plates or outdoor applications such as exterior parts, without necessity to apply a coating step to a molded product with drawn from the mold.

What is claimed is:

1. A method of in-mold coating, comprising steps of injecting a melt of a thermoplastic resin molding material into a cavity of a mold having an inner wall, followed by molding, to form a molded product, then injecting a coating composition between the molded product and the inner wall of the mold, followed by curing the coating composition, to form a coated molded product, and withdrawing the coated molded product from the mold, wherein said coating composition comprises:

(A) a vehicle component comprising (i) a urethane acrylate oligomer or a urethane methacrylate oligomer, which is a reaction product, containing no substantial unreacted isocyanate groups, of (a) an organic polyisocyanate, (b) an organic polyol and (c) a hydroxyalkyl acrylate or a hydroxyalkyl methacrylate, and (ii) a polymerizable unsaturated monomer, (B) a polyisocyanate compound, and (C) a polymerization initiator.

2. The method of in-mold coating according to claim 1, wherein the coating composition comprises:

(A) 100 parts by weight of the vehicle component comprising (i) from 20 to 80 wt % of the urethane acrylate oligomer or the urethane methacrylate oligomer, and (ii) from 80 to 20 wt % of the polymerizable unsaturated monomer, (B) from 1 to 10 parts by weight of the polyisocyanate compound, and (C) from 0.1 to 5 parts by weight of the polymerization initiator.

3. The method of in-mold coating according to claim 1, wherein the thermoplastic resin molding material comprises at least one member selected from the group consisting of a polyamide resin, a polyamide resin alloy material, a polyester resin and a polyester resin alloy material.

4. The method of in-mold coating according to claim 1, wherein the thermoplastic resin molding material comprises a resin having functional groups reactive with isocyanate groups of the polyisocyanate compound.

5. The method of in-mold coating according to claim 4, wherein the functional groups reactive with isocyanate groups of the polyisocyanate compound are carboxyl groups or hydroxyl groups.

6. The method of in-mold coating according to claim 1, wherein the coating composition is injected under such a condition to create an in-mold pressure P and the in-mold pressure P created by the thermoplastic resin molding material injected into the mold cavity is 0<P≦500 kgf/cm$^2$ (gauge pressure), wherein the thermoplastic resin molding material comprises at least one member selected from the group consisting of polyamide resin, a polyamide resin alloy material comprising a polyamide resin and a crystalline thermoplastic resin, a polyester resin, and a polyester resin alloy material comprising a polyester resin and a crystalline thermoplastic resin.

7. The method of in-mold coating according to claim 1, wherein a melt of a thermoplastic resin material comprising at least one member selected from the group consisting of a polyamide resin alloy material comprising a polyamide resin and an amorphous thermoplastic resin, and a polyester resin alloy material comprising a polyester resin and an amorphous thermoplastic resin, is injected into the mold cavity, followed by molding, to form a molded product, and a space is formed between the molded product and the inner wall of the mold, whereupon the coating composition is injected into the space.

8. The method of in-mold coating according to claim 1, wherein a melt of a thermoplastic resin molding material comprising a polyamide resin alloy material comprising a polyamide resin and an amorphous thermoplastic resin, and/or a polyester resin alloy material comprising a polyester resin and an amorphous thermoplastic resin, is injected into the mold cavity in a state where a mold comprising a fixed mold half and a movable mold half is maintained with a predetermined clamping force, pressure is maintained for a predetermined period of time for molding, then the mold clamping force is reduced to form a space between the molded product and the inner wall of the mold, whereupon the coating composition is injected into the space.

9. The method of in-mold coating according to claim 4, wherein the resin having functional groups reactive with isocyanate groups of the polyisocyanate compound is a bisphenol A vinyl ester having hydroxyl groups, with a molecular weight of from 1,000 to 2,000.

10. The method of in-mold coating according to claim 4, wherein the resin having functional groups reactive with isocyanate groups of the polyisocyanate compound is a partially esterified product of a styrene/maleic anhydride copolymer having carboxyl groups, with a molecular weight of from 1,000 to 2,000.

11. A method of in-mold coating, comprising steps of injecting a melt of a thermoplastic resin molding material into a cavity of a mold having an inner wall, followed by molding, to form a molded product, then injecting a coating composition between the molded product and the inner wall of the mold, followed by curing the coating composition, to form a coated molded product, and withdrawing the coated molded product from the mold, wherein said coating composition comprises:

(A) a vehicle component comprising (i) a urethane acrylate oligomer or a urethane methacrylate oligomer of the formula (I):

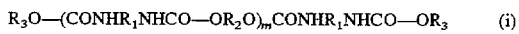

$$R_3O-(CONHR_1NHCO-OR_2O)_m CONHR_1NHCO-OR_3 \quad (i)$$

wherein m is an integer of from 1 to 10, $R_1$ is a moiety having isocyanate groups removed from a diisocyanate compound, $R_2$ is a moiety having hydroxyl groups removed from a diol compound, and at least one of $R_1$ and $R_2$ has an aliphatic cyclic structure, and $R_3$ is a moiety having a hydroxyl group removed from a hydroxyl group-containing acrylate or methacrylate, and (ii) a polymerizable unsaturated monomer, (B) a polyisocyanate compound, and (C) a polymerization initiator.

12. The method of in-mold coating according to claim 11, wherein the coating composition comprises:

(A) 100 parts by weight of the vehicle component comprising (i) from 20 to 80 wt % of the urethane acrylate oligomer or the urethane methacrylate oligomer, and (ii) from 80 to 20 wt % of the polymerizable unsaturated monomer, (B) from 1 to 10 parts by weight of the polyisocyanate compound, and (C) from 0.1 to 5 parts by weight of the polymerization initiator.

13. The method of in-mold coating according to claim 11, wherein the thermoplastic resin molding material comprises at least one member selected from the group consisting of a polyamide resin, a polyamide resin alloy material, a polyester resin and a polyester resin alloy material.

14. The method of in-mold coating according to claim 11, wherein the thermoplastic resin molding material comprises a resin having functional groups reactive with isocyanate groups of the polyisocyanate compound.

15. The method of in-mold coating according to claim 14, wherein the functional groups reactive with isocyanate groups of the polyisocyanate compound are carboxyl groups or hydroxyl groups.

16. The method of in-mold coating according to claim 1, wherein the coating composition is injected under such a condition to create an in-mold pressure P and the in-mold pressure P created by the thermoplastic resin molding material injected into the mold cavity is $0<P \leq 500$ kgf/cm² (gauge pressure), wherein the thermoplastic resin molding material comprises at least one member selected from the group consisting of polyamide resin, a polyamide resin alloy material comprising a polyamide resin and a crystalline thermoplastic resin, a polyester resin, and a polyester resin alloy material comprising a polyester resin and a crystalline thermoplastic resin.

17. The method of in-mold coating according to claim 11, wherein a melt of a thermoplastic resin material comprising at least one member selected from the group consisting of a polyamide resin alloy material comprising a polyamide resin and an amorphous thermoplastic resin, and a polyester resin alloy material comprising a polyester resin and an amorphous thermoplastic resin, is injected into the mold cavity, followed by molding, to form a molded product, and a space is formed between the molded product and the inner wall of the mold, whereupon the coating composition is injected into the space.

18. The method of in-mold coating according to claim 11, wherein a melt of a thermoplastic resin molding material comprising a polyamide resin alloy material comprising a polyamide resin and an amorphous thermoplastic resin, and/or a polyester resin alloy material comprising a polyester resin and an amorphous thermoplastic resin, is injected into the mold cavity in a state where a mold comprising a fixed mold half and a movable mold half is maintained with a predetermined clamping force, pressure is maintained for a predetermined period of time for molding, then the mold clamping force is reduced to form a space between the molded product and the inner wall of the mold, whereupon the coating composition is injected into the space.

19. The method of in-mold coating according to claim 14, wherein the resin having functional groups reactive with isocyanate groups of the polyisocyanate compound is a bisphenol A vinyl ester having hydroxyl groups, with a molecular weight of from 1,000 to 2,000.

20. The method of in-mold coating according to claim 14, wherein the resin having functional groups reactive with isocyanate groups of the polyisocyanate compound is a partially esterified product of a styrene/maleic anhydride copolymer having carboxyl groups, with a molecular weight of from 1,000 to 2,000.

* * * * *

UNITED STATES PATENT AND TRADEMARK OFFICE
CERTIFICATE OF CORRECTION

PATENT NO. : 5,736,090
DATED : April 7, 1998
INVENTOR(S) : Yoshiaki YAMAMOTO, et al.

It is certified that error appears in the above-identified patent and that said Letters Patent is hereby corrected as shown below:

On the title page, item [73], the first assignee should be:

--Dai Nippon Toryo Co., Ltd.--

Signed and Sealed this

Twenty-third Day of June, 1998

Attest:

BRUCE LEHMAN

*Attesting Officer*  *Commissioner of Patents and Trademarks*